Figure 7:
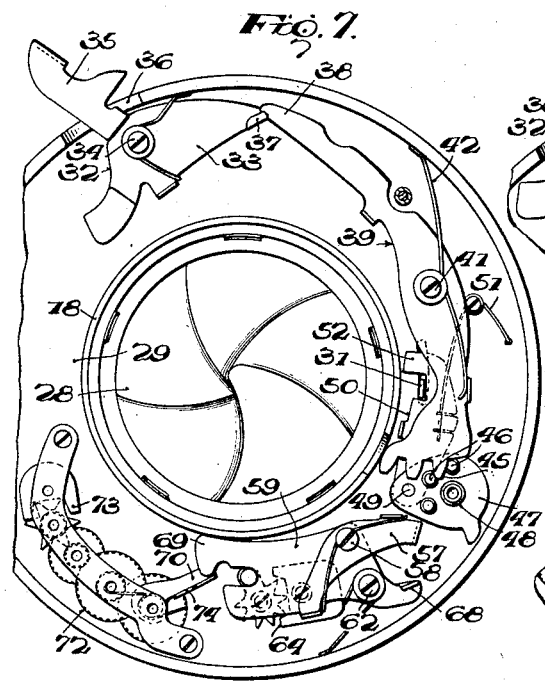

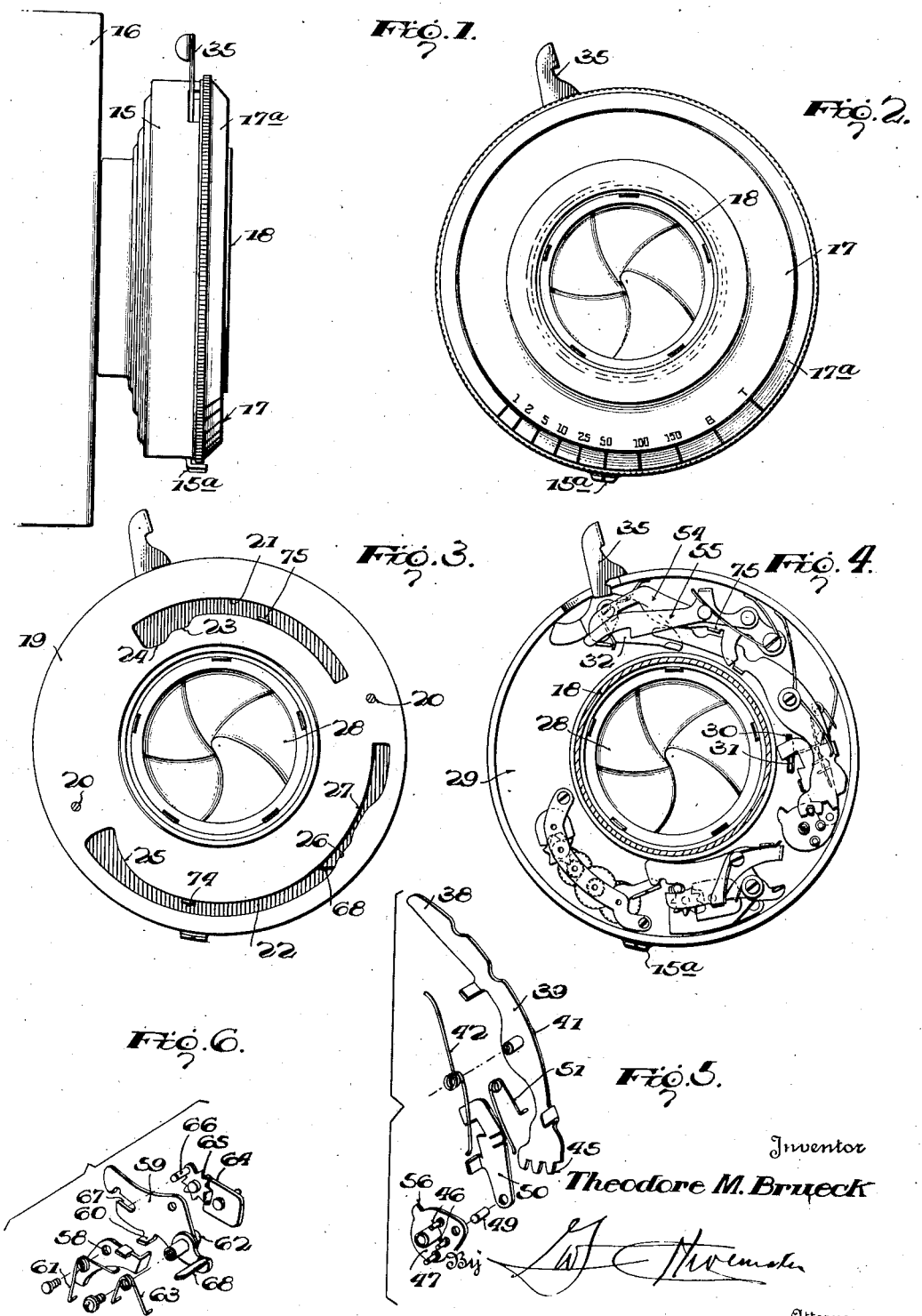

Sept. 6, 1938.  T. M. BRUECK  2,129,561

SHUTTER OPERATING MECHANISM

Filed Sept. 11, 1937  2 Sheets-Sheet 2

Inventor
Theodore M. Brueck.
By
Attorney

Patented Sept. 6, 1938

2,129,561

UNITED STATES PATENT OFFICE 2,129,561

SHUTTER OPERATING MECHANISM

Theodore M. Brueck, Rochester, N. Y., assignor to Ilex Optical Company, Rochester, N. Y., a corporation of New York Application September 11, 1937, Serial No. 163,493

5 Claims. (Cl. 95—63)

The present invention relates generally to shutter operating mechanisms for cameras, and more particularly to those in which for various reasons it is essential that the shutter action shall attain high speed in automatic opening and closing movement in making what are commonly known as instantaneous exposures.

It is a well known fact that with a moving subject and what are known as speed films, it is essential that the shutter action attain a high speed, that is that it close in such a small fraction of a second's time after it is opened that the objective is caught in movement and only sufficient light enters for the proper registration of the subject on the film.

The primary object of the invention is the provision of an arrangement whereby automatic shutter action which though controllable to low speeds, is capable of extremely high speeds where such extreme speeds are desirable or necessary.

Bearing in mind that the present invention applies only to automatic shutter action, that is where there is both opening and closing movements of the shutter following one another in more or less speedy order upon a single actuation of the finger release, it is an object of the invention to effect both opening and closing movements, or in other words complete shutter action, by the movement of a shutter actuator continuously in a single direction so there can be no interim between shutter opening and closing in so far as this actuator is concerned and so that, leaving out of consideration the question of retardation, the movement of this actuator effecting the opening and closing of the shutter, is a single sweep through a continuous stroke.

It is necessary of course to provide some controllable means of retardation, that is some means by which the time of closing of the shutter may be retarded more or less with respect to its time of opening and in keeping with this fact it is a further object of the invention to provide a mechanism of the foregoing type in which a retarding mechanism of a controllable finely graduated range of effectiveness is employed to graduated range of effectiveness is employed to the shutter actuation during automatic shutter action from a very slow to a relatively high speed, which retarding mechanism may be entirely eliminated during the highest speed of action in which the shutter actuator opens and closes the shutter by a single continuous unretarded movement in one direction.

Generally speaking, and without regard to the requirements of bulb and time action, with which the present invention does not deal, the mechanism with which we have to deal in the present invention may include a master lever or member which has a manually actuated movement in one direction and a spring actuated return movement in all automatic shutter action. This master member is preferably, throughout both of its foregoing movements, constantly in connection with a shutter actuator so that the latter moves in one direction during manually actuated movement of the master member and in the opposite direction during the spring actuated return movement of the master member. During the first of these movements of the actuator, it is set into operative engagement with the shutter mechanism and during the second or spring actuated movement the operative engagement with the shutter thus established, permits the actuator to both open and close the shutter. The maximum speed of this shutter opening and closing action is therefore the speed with which the actuator, unchecked, moves continuously through its return stroke constantly in one direction, and this speed is controllable when retarding means are interposed to more or less check the actuator in its spring actuated shutter closing portion of its return movement. The invention provides a novel controllable retarding means effective through a wide range of speeds in connection with shutter closing movements, as well as for entire elimination when the highest speed in shutter action is desired.

With the above objects and general explanation of the invention, further objects of the invention, as well as the specific means by which it is at present contemplated that the invention may be carried into practical use, will more clearly appear in the course of the following detailed description, and by reference to the accompanying drawings, forming a part of this specification and in which—

Fig. 1 is a side view of the shutter casing.
Fig. 2 is a front elevation thereof.
Fig. 3 is a front view of the rotatable cam controlling link, with the front adjusting plate removed.
Fig. 4 is a front elevation showing the entire shutter operating mechanism, with the front adjusting plate and cam ring removed.
Fig. 5 is a detail perspective view of the several parts of the master lever or member and shutter actuator, exploded.
Fig. 6 is a similar view of the supplemental retarding lever, forming a part of the retarding means, and the parts thereof, and Figs. 7, 8, 9 and 10 are views similar to Fig. 4, on a somewhat enlarged scale, showing the mechanism of the present invention in various positions, and with the bulb and the controlling levers removed.

Referring now to these figures there is shown in Figures 1 and 2 a shallow cylindrical casing 15 attachable in any suitable manner and by any suitable means at its rear portion to a camera such as generally indicated at 16 in Fig. 1.

The front of the casing 15 is closed by a rotatable adjusting plate 17, preferably having a bevelled peripheral portion 17ª, the latter of which, it is contemplated, will have a series of graduations, to be hereinafter further referred to, for cooperation with an index point 15ª which may be carried by the casing 15. This adjusting plate 17 is rotatable for adjusting purposes around the lens tube 18, and rearwardly of the said adjusting plate is a cam adjusting ring 19 plainly shown in front face view in Fig. 3 and concealed from view by the plate to which it is attached as by means of pins or posts 20 so that it follows adjusting movements of the adjusting plate.

The cam ring 19 as illustrated in Fig. 3, is provided with diametrically opposed elongated concentric slots 21 and 22, and since the slot 21 is merely provided for use in connection with the bulb and time control of the shutter actuation, and these features are not otherwise concerned with the present invention, it need not be further described than as having a stepped cut away portion at one end, the left end as viewed from its front face, the steps of which are indicated at 23 and 24, the former effective when bulb exposures are to be made and the latter effective in connection with time exposures.

The lower slot 22 on the other hand is vitally concerned in the present invention and for the purposes thereof, the ring has along the inner edge of this slot at its left end a gradually cut away cam edge 25. Likewise the ring has along the outer edge of slot 22 adjacent the right hand end thereof stepped portions 26 and 27 protruding into the slot, these steps being for a purpose which will more clearly appear hereinafter.

The present invention is not concerned with any particular construction of shutter although it is easily adapted according to the present disclosure to the well known iris type of shutter shown at 28 which closes and opens across the space within the lens tube 18 and includes several leaves which are housed and pivotally swingable in the rear portion of the casing 15 behind a ring shaped body plate 29. This body plate which serves as a support for the shutter actuating mechanism, divides the casing into front and rear compartments and snugly surrounds the lens tube 18 in fixed relation within the casing. The shutter 28 is disposed within the rear compartment, its leaves being simultaneously actuated in opening and closing movements through an arm 31 which for this purpose slides back and forth within a slotted opening of the body plate 29 through which said arm 31 thus projects into the forward compartment for operative connection with the shutter actuating mechanism.

The shutter 28 of the type disclosed and the manner in which its leaves are simultaneously shifted by backward and forward sliding movements of the arm 31 are all well known in the art.

Figure 9:
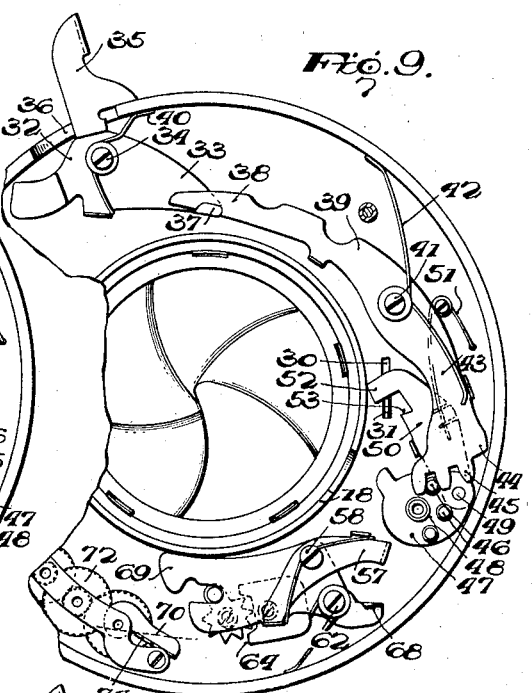
Figure 8:
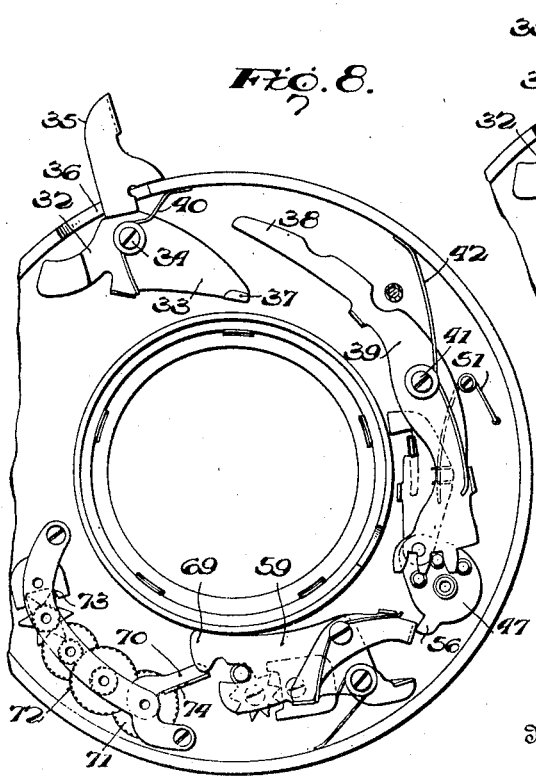
Figure 10:
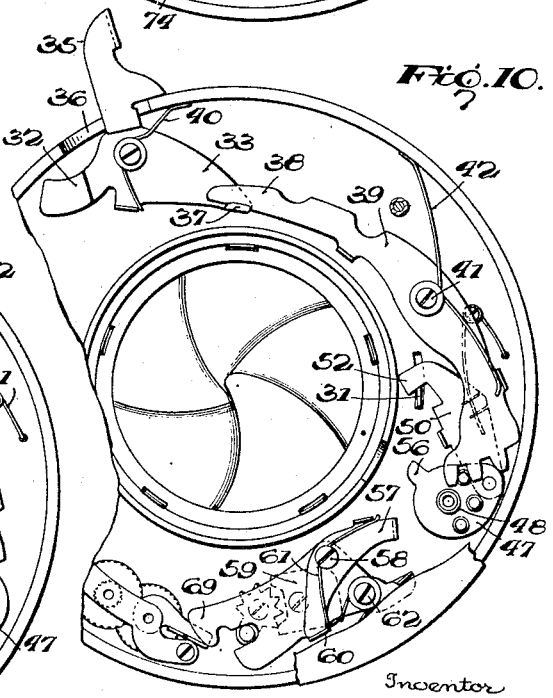

Pivotally mounted on the upper portion of the plate 29, as most plainly seen in Figs. 7 to 10, inclusive, is a release member 32 which has within the forward compartment of the casing a laterally enlarged inner portion 33 inwardly beyond its pivot 34. This release member also has a finger piece 35 outwardly beyond its pivot which projects exteriorly through a slot 36 in the forward edge of the peripheral wall of the casing 15. At the extremity of its inner laterally enlarged portion 33 the finger release, thus constituted in so far as the present invention is concerned, has a forwardly angular lip 37 for wiping contact with one tapering end 38 of the master lever or member generally indicated at 39, when the finger release is rocked in a counterclockwise direction from its normal position as shown in Figs. 8, 9 and 10 in which it is held by a spring 40 toward the actuating position shown in Fig. 7. It will be noted at this point that as the finger release moves to the end of its counterclockwise actuating movement it wipes past and free of the end 38 of the master member, thus freeing the latter for its return movement.

The master lever or member 39 is of slender elongated form with its tapering end 38 extending upwardly and with its pivot point 41 intermediate its ends, supporting its controlling spring 42 by which it is urged to a normal position shown in Figs. 9 and 10 wherein its depending end 43 is limited by reason of the engagement of a lateral boss 44 against the inner surface of the adjacent portion of the casing wall.

The depending arm 43 of the master member is provided with a series of endwise projecting teeth 45 which are in operative engagement with the forwardly projecting pins 46 of an oscillatable actuator 47 moving on a pivot 48.

The actuator 47 is disk-like in form and in a body plane rearwardly of the master member. At one point this actuator is pivotally connected at 49 to one end of a drag link 50, it being noted that the pivotal connection 49 is, in the normal position of the actuator, in a line substantially at one side of a line connecting the actuator pivot 48 with the shutter actuating arm 31.

The free end of the drag link 50 which is normally pressed angularly inwardly toward the lens tube 18 by its controlling spring 51, has a laterally angular hooked end 52 extending over the adjusting arm 31 and in the normal position of the parts holding this arm downwardly at the lower end of its slot 30. Inwardly beyond its angular extremity 52, the drag link 50 has a shoulder 53 for positioning beneath the shutter actuating arm 31 when the actuator 47 has been shifted counterclockwise on its pivot 48 as the master member 39 moves through its initial manually actuated stroke against the tension of its spring 42. This position of the parts is shown in Fig. 7.

In Fig. 4 there are shown pivoted levers 54 and 55 which cooperate with the master member 39 and the finger release 32 in bulb and time actuation of the shutter mechanism, but since these parts form no feature of the present invention and the provision for such actuation is well known in the art it is believed no further description either of their construction or operation need be made. It is with this in mind that the levers 54 and 55 have been eliminated from the showing in Figs. 7 to 10, inclusive, in order that the parts involved in the present invention may be made to more clearly appear and stand out.

Thus leaving out of consideration the question of retardation of the closing actuation of the shutter mechanism in relation to its opening actuation, it is apparent from the foregoing description that when during the rocking movement of the finger release 32 from the position for instance shown in Fig. 10 toward the position shown in Fig. 7, the master member 39 is rocked clockwise on its pivot 40, the lower toothed end of this lever, shifting inwardly toward the lens tube 18, imparts rotative movement to the actuator 47 in a counterclockwise direction during which the pivot point of the drag link 50 passes from the outer side of the actuator pivot 48 to the inner side thereof so that it is substantially in line with the plane of movement of the shutter actuating arm 31, with its shoulder 53 immediately beneath said arm. Thus in this, the manually actuated movement of the master member, it brings about a movement of the actuator which shifts the latter to what may be said to be its set position, wherein it is in operative engagement through its thus positioned drag link 50 with the shutter actuating arm 31 so that when the finger release 32 has wiped past the extremity of the tapering end 38 of the master member and the latter is thus released for return movement by its spring 42, it will through its geared connection with the actuator 47 then return the latter in a clockwise rotative movement during which the drag link 50 in its return to the normal position shown in Fig. 9 will first shift the shutter actuating arm 31 upwardly in the slot 30 by reason of the engagement of shoulder 53 therewith, and subsequently pull this actuating arm downwardly, all in a continuous single swinging wiping movement of the actuator and a single movement of the master member effecting both an opening and closing of the shutter. It is notable that in this movement in so far as the master member and actuator are concerned there is no hesitation, stopping and restarting. The parts when once released by the finger release, for return spring movement, carry through this movement in a single continuous stroke and by the arrangement shown and described the shutter is both opened and closed, giving the maximum speed of action.

In order to provide for retarding the closing movements of the shutter 28 and to bring about effective controllable regulation thereof with respect to the opening movements, the actuator disk 47 has a peripheral lug 56, in the path of movement of which is one end of an angular contact arm 57. This contact arm is pivoted at 58, intermediate its ends, upon a retarding lever 59 and this lever has at its outer edge an upstanding ear 60 with which the other end of arm 57 is engageable to form a limit for independent rocking of the arm in a counterclockwise direction, leaving the same to yield freely on its pivot 58 in a clockwise direction. This movement of the contact arm 57 is yieldably controlled by a spring 61 which serves to normally hold one end of the arm against the stop 60.

The retarding lever 59 is pivotally mounted on the plate 29 at 62 and at a point which permits body movement of lever 59 on its said pivot 62 to swing contact arm 57 into and out of the path of movement of the actuator lug 56. A spring 63 normally holds lever 59 at the end of its clockwise swinging movement with the free end of arm 57 in the path of movement of lug 56 so that during the initial manually actuated counterclockwise rotative movement of the actuator 47 its lug 56 strikes the contact arm 57 positioned as in Fig. 9 and may freely proceed past the contact arm without affecting movement of the retarding lever 59 by reason of the freedom of arm 57 to yield and let the lug slip past the same to the position shown in Fig. 8 and then to the position shown in Fig. 7. In other words during the initial rotative movement of the actuator 47 the retarding lever 59 is not shifted on its pivot 60, but merely the contact arm 57, and it will be noted that at the end of this movement the lug 56 has been moved to a point as shown in Fig. 7 where it is so spaced from the contact end of contact lever 57 that in the subsequent spring actuated return movement as above described, the lug will not come into contact with arm 57 until it has completed that portion of its arc of movement which brings about the opening of the shutter 28. When the lug 56 does engage contact arm 57, the latter being then unable to rock in a counterclockwise direction with respect to the lever 59, forces the lever itself to rock in a counterclockwise direction upon its pivot 62 in order to let the lug 56 pass the same to complete its return movement and close the shutter.

Independent of other retarding features as presently described, the retarding lever 59 is, in addition to its spring 63, controlled by an escapement 64, the toothed member 65 of which has a forwardly projecting pin 66 movable in a slotted recess 67 of lever 59.

At its end, beyond the pivot 62, lever 59 has an upstanding controlling stem 68, and its other end at the opposite side of pivot 62 terminates in a contact head 69 in the path of swinging movement of which is an angular engaging piece 70 secured in connection with the terminal gear 71 of a retarding gear train 72 which with its cooperating escapement 73 forms the second retarding member of the retarding mechanism. The angular contact piece 70 has an upstanding controlling stem 74 and normally extends angularly inwardly from the respective end of the gear train into engagement with the contact head 69 of retarding lever 59 when the latter is in its normal position as plainly shown in Fig. 8.

Thus when in its return spring actuated movement the actuator 47 presents its lug 56 into contact with the arm 57 at the end of the opening movement of the shutter, retarding lever 59 must rock on its pivot 62 in order to permit the lug 56 to pass and allow the actuator to complete the shutter closing portion of its movement and this swinging movement of lever 59 in a counterclockwise direction is resisted for the full length of its stroke by the retarding gear train so that the lever 59 can swing but slowly. Obviously if the contact piece 70 is held in more or less spaced relation from the contact head 69 of lever 59, to thus vary the extent of the effect of the retarding gear train in the full rocking movement of lever 59, the latter may move more quickly through its necessary swinging movement with the result that the shutter will be more quickly closed. This variation is possible through the entire swinging movement of the contact piece 70, and the latter is shifted outwardly beyond the limit of swinging movement of lever 59, thus leaves the lever 59 as the only means to retard closing movement of the shutter.

Substantially the same thing is true of lever 59 since by means of its controlling stem 68 it may be held in several positions to vary its retarding effect on the actuator 47, including the position shown in Fig. 10 where it is held at the very end of its counterclockwise swinging movement with the contact end of its arm 57 beyond the path of swinging movement of the actuator lug 56.

Thus the closing movement of the shutter may be controlled in various degrees through the position of the contact piece 70 of the gear train so that this gear train acts more or less in checking the closing movement of the shutter. In another position the gear train or second member of the retarding mechanism may be held entirely out of influence, leaving the retarding effect entirely to the lever 59 whose retardation effect is obviously substantially less than the second member or gear train. In still other positions the retarding lever 59 may be held to either lessen its checking effect or altogether eliminate this effect upon the closing movement of the shutter.

For the above purpose the controlling stems 68 and 74, respectively, of lever 59 and gear train 72, outstand within the slot 22 of the adjusting ring 19 before described, stem 68 of lever 59 being positioned in engagement with the edge of the adjusting ring along the outer side of said slot and adjusting stem 74 being engaged with the edge of the adjusting ring along the inner side of the slot as plainly seen in Fig. 3.

Thus on account of the relative positions of these two adjusting stems it is obvious that when ring 19 is shifted to position stem 74 at the left hand end of the slot the width of the slot permits full stroke of lever 59 and full action of the gear train retarding means. As the adjusting ring 19 is moved or adjusted clockwise, the cam portion 25 at the inner edge of the slot 22 gradually moves the adjusting stem 74 in an outward direction to hold the contact piece 70 gradually a greater distance from the contact head 69 of lever 59 to thus gradually lessen the influence of the retarding gear train. This continues until at the end of the cam edge 25 the gear train is held completely out of retarding effect and in the further clockwise adjusting movements of the cam ring 19 it is so maintained. At about this time however the adjusting stem 68 of lever 59 is forced inwardly by reason of its sliding movement onto the step 26 and at this point the lever 59 is so held that the cushion of its stroke influences retardation of the actuator in a closing of the shutter. This effect is increased upon further adjusting movement of the ring 19 when the adjusting stem 68 rests on the step 27, at which point the lever 59 is held in a position as shown in Fig. 10 in which the contact arm 57 is completely without the path of swinging movement of the actuator lug 56, thus leaving the latter without retardation.

That portion of the slot 22 beyond the step 27 merely provides for reception of the stem 68 at a time when the controlling stem 75 of the time and bulb lever 54 and 55, which protrudes through slot 21, is positioned on step 23 for bulb exposures and step 24 for time exposures.

Plainly from the foregoing there is embodied a two stage retarding action, one stage being the lever 59 and the other stage being the gear train 72. Equally plainly each of these stages is capable of ready control as to its effect in connection with the general retarding operation and each is capable in turn of entire elimination so that without any checking effect the actuator 47 may in its spring actuated return movement both open and close the shutter in a single continuous sweeping stroke in one direction.

By a comparison of Figs. 2 and 3 it will be noted that the graduations of the bevelled edge 17ᵃ of the front adjusting plate 17 correspond with the index 15ᵃ of the casing in a manner to denote the various speeds of the shutter actuation coinciding with the relative positions of the adjusting stems 68 and 74 so as to provide for a wide range between the slowest and the speediest shutter action.

What is claimed is:

1. An automatic shutter mechanism, comprising actuating means including an actuator movable in opposite directions and having means shiftable during its movement in one direction into operative engagement with the shutter mechanism and for opening and closing the latter during movement of the actuator in the opposite direction, a master member wholly at one side of, and in geared relation with, the said actuator for causing movement thereof in both directions, a retarding device spaced from the other side of the actuator, a retarding lever located wholly between the actuator and said retarding device, having one end thereof in operative association with said retarding device and having at its other end a pivoted arm in the path of movement of the actuator and independently yieldable in one direction permitting passage of the actuator in one direction without moving said lever, and a single adjusting cam member operatively associated with the retarding device and retarding lever for independently regulating the effectiveness thereof in operation and respectively holding them out of contact with one another and with the actuator.

2. An automatic shutter mechanism, comprising actuating means including an actuator having an outstanding lug and movable in opposite directions, means in connection with said actuator and shiftable during its movement in one direction into operative engagement with the shutter mechanism for opening and closing the latter during movement of the actuator in the opposite direction, a master member in geared relation with said actuator for moving the same in both directions, a retarding lever pivoted intermediate its ends, having a controlling escapement mechanism and having a rigid head at one end and a pivoted arm at the other end independently yieldable in one direction and adjustably positionable within and beyond the path of movement of the actuator lug, and a retarding mechanism having a contact piece adjustably positionable within and beyond the path of movement of the said rigid head of said lever.

3. A shutter mechanism, actuating means therefor including an actuator having rotatable movement in opposite directions and provided with an outstanding lug, a member carried by said actuator and shiftable during movement thereof in one direction for operative engagement with the shutter mechanism and for opening and closing the latter during movement of the actuator in the opposite direction, a retarding device, a pivoted retarding lever disposed wholly between said retarding device and the actuator and having a head at one end engaging the former for retarding movement of said lever, an escapement mechanism in connection with said lever to independently retard its movement, a pivoted contact arm carried by said lever adjacent to its opposite end, said arm extending into the path of movement of the lug of said actuator and independently yieldable on its pivot in one direction to permit passage of the actuator in one direction without moving the lever, and means in engagement with said lever for shifting the same bodily on its pivot to adjust the contact arm toward and away from the actuator lug.

4. An automatic shutter mechanism, comprising actuating mechanism including an actuator mounted for movement in opposite directions and having a peripherally outstanding lug, means carried by the actuator and shiftable during its movement in one direction into operative engagement with the shutter mechanism and for opening and closing the latter during movement of the actuator in the opposite direction, a master member lying wholly at one side of the actuator in geared relation with said actuator for moving the same, a retarding lever pivoted and wholly disposed at the opposite side of the actuator and having an engaging head at its end remote therefrom, a pivoted contact arm carried by the near end of said lever and interposed in the path of movement of the lug of the actuator and having independent yielding movement to permit the actuator lug to pass the same in its movement in one direction, means to shift said lever bodily on its pivot to regulate the position of said contact arm in respect to the actuator lug and move the same out of the path thereof, a retarding device having a swinging contact piece extending into the path of movement of the head end of said lever, and means to independently adjust the position of said contact piece with respect to said lever head for controlling the effectiveness of said retarding device.

5. In an automatic shutter actuating mechanism, a master member swingable in opposite directions, a shutter actuating member geared to said master member and mounted for movement rotatably in opposite directions, said actuator having a rigid outstanding peripheral lug, an intermittently pivoted retarding lever having retarding means and having a pivoted contact member in the path of movement of the actuator lug and independently yieldable with respect to the lever during movement of the actuator in one direction, one end of said lever having an outstanding adjusting stem and the other end thereof having a contact head, a retarding device having a swingable contact piece interposed in the path of movement of the contact head of said lever and provided with an outstanding adjusting stem, and a cam ring having a slot through which said adjusting stems project and having the opposite walls of its slot provided with portions independently engaging said stems for shifting of the retarding device in the line of movement of the contact piece to the engaging head of the retarding lever and for shifting the retarding lever bodily on its pivot to adjust its said pivoted contact member in the line of movement of the actuator lug.

THEODORE M. BRUECK.

CERTIFICATE OF CORRECTION.

Patent No. 2,129,561. September 6, 1938.

THEODORE M. BRUECK.

It is hereby certified that error appears in the printed specification of the above numbered patent requiring correction as follows: Page 3, second column, line 63, for the word "is" read if; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.